United States Patent [19]

Peterson

[11] Patent Number: 4,509,829

[45] Date of Patent: Apr. 9, 1985

[54] AMPLITUDE MODULATOR FOR A HIGH POWERED BEAM OF INFRARED RADIATION

[75] Inventor: Lauren M. Peterson, Ann Arbor, Mich.

[73] Assignee: The Environmental Research Institute of Michigan, Ann Arbor, Mich.

[21] Appl. No.: 304,401

[22] Filed: Sep. 21, 1981

[51] Int. Cl.³ .............................................. G02F 1/11
[52] U.S. Cl. ................... 350/358; 350/354; 372/31; 372/34; 372/26
[58] Field of Search ............... 350/358, 354; 372/31, 372/13, 11, 32, 26, 29, 34; 330/4.3; 332/7.51

[56] References Cited

U.S. PATENT DOCUMENTS 3,964,825  6/1976  Eschler ............................ 350/358

*Primary Examiner*—William L. Sikes
*Assistant Examiner*—Léon Scott, Jr.
*Attorney, Agent, or Firm*—Krass & Young

[57] ABSTRACT

A method and device for amplitude modulating a high powered beam of infrared radiation at frequencies in the megahertz range are disclosed. A laser is used to generate a beam of 4-40 watts of power and the beam is passed through as acousto-optical crystal having an acoustic transducer on one surface. A standing acoustical wave in the crystal is provided by a low powered drive signal at a frequency of one to ten megahertz. The beam is efficiently modulated by the standing wave at exactly twice the frequency of the drive signal. The device incorporates a heat sinking arrangement which serves to preclude deleterious action of divergent acoustical waves generated in the crystal, as well as to provide excellent removal of thermal energy.

10 Claims, 2 Drawing Figures

AMPLITUDE MODULATOR FOR A HIGH POWERED BEAM OF INFRARED RADIATION

BACKGROUND OF THE INVENTION

This invention relates to amplitude modulating techniques and, more particularly, to the task of amplitude modulating a high powered laser beam.

There are several applications in which it is desirable to modulate a beam of electromagnetic radiation for transmission. One such application is to provide an amplitude modulated source of infrared radiation to be used as sensing beams for gathering three dimensional image information which can be retrieved and later processed to extract useful data from a sensed object. A particularly powerful image processor for analyzing such image data is disclosed in U.S. Pat. No. 4,167,728 to Sternberg and related improvements such as those disclosed in U.S. Ser. No. 73,818, filed Sept. 10, 1979, to Sternberg, now U.S. Pat. No. 4,322,716, which are hereby incorporated by reference. Where these sensors are designed to detect objects whch are far away, the source of the detection beam must be relatively powerful and the beam must be amplitude modulated within a prescribed frequency range to achieve optimum performance. Preferably, the detection beams are derived from a $CO_2$ laser providing 4-40 watts of power and providing a beam of 5-7 millimeters in diameter.

One widely used technique for modulating light beams is through the use of electro-optical devices. Electro-optical modulation unfortunately entails birefringent crystals, polarization analyzers, and quarter-wave plates. The high drive powers (in order of 4-40 watts) required for electro-optical modulation of high power laser beams also leads to problems resulting from RF heating when modulation is carried out in the megahertz range.

Traveling wave acousto-optic modulators are, on the other hand, less expensive and simpler devices which require less drive power for achieving amplitude modulation of collimated laser radiation. In traveling wave acousto-optical modulators the laser beam is passed through a medium such as germanium which has an acoustic transducer mounted on one surface. The acoustic transducer is driven by a relatively high frequency source (typically 40-50 megahertz) which generates an acoustical wave which travels from one end of the medium and passes out of the other end. Modulation is accomplished by turning the acoustical drive source on and off. Modulation frequencies of up to tens of megahertz may be achieved if the laser beam is focused to a very small diameter.

Thus, it can be appreciated that while traveling wave acousto-optical modulation techniques may be valuable for low power laser beams, this approach is not practical for moderate to high power beams. The power density within the focal volume of the higher powered beams may readily exceed the damage threshold of the optical medium. It has been discovered that continuous wave $CO_2$ lasers with several watts of output power may only be modulated to frequencies of no higher than about one megahertz using traveling wave acousto-optical devices. Even so, the modulation efficiency is very low, approaching only about 30%. Those skilled in the art will appreciate that this results in a very poor signal to noise ratio.

OBJECTS AND SUMMARY OF THE INVENTION

It is an object of this invention to provide a method and a device for efficiently amplitude modulating a high powered beam of infrared radiation at relatively high modulating frequencies, preferably in excess of one megahertz.

It is a further object of this invention to accomplish the above objective in a comparatively inexpensive manner requiring low drive power which will operate over an extended period of time in an extremely satisfactory manner.

These and other objects of the invention are provided by way of generating a standing (as compared to traveling) acoustical wave front in an acousto-optical medium, such as a germanium crystal and using the cyclical collapsing acoustical wave front to modulate a high powered laser beam passing through the medium. An acoustical transducer on the medium is driven by a low powered source of drive signals at half the desired modulation frequency.

In the preferred embodiment, a laser is used to generate a 4-40 watt beam with a diameter of 5-7 millimeters. The beam is passed through a germanium crystal having a lead zirconate titanate (PZT) acoustic transducer on one surface. A standing acoustical wave front is generated in the crystal generally perpendicular to the axis of the beam by applying a drive signal of less than two watts at a frequency less than ten megahertz to the transducer.

Very little drive power is required and almost 100% modulation has been achieved even though the drive frequencies are so low. Conventional thinking in the art would lead one to believe that good modulation efficiency could only be obtained while operating acousto-optical devices in the Bragg region (drive frequencies above 26 megahertz) and that poor results would be obtained for devices characterized as Raman-Nath cells having much lower drive frequencies.

Another feature of the present invention includes provision of a unique construction for carrying out the above modulation technique. A heat sink includes a major upper surface and an upstanding portion with an end face extending perpendicular to the major surface. The acousto-optical medium takes the form of an elongated block having its bottom affixed to the major surface of the heat sink and an upper portion of one side affixed to the end face of the upstanding portion of the heat sink. A strip of acoustic transducer material is secured to an opposite lower side of the optical medium beneath a projection of the contact area between the medium and the heat sink end face. Drive means are coupled to the transducer to generate the standing acoustical wave in the lower portion of the medium having an unobstructed opposite lower side spaced from the heat sink end face. In such manner the acoustic wave is efficiently reflected back upon itself in that portion of the medium through which the beam passes. Divergent acoustic waves are coupled out of the medium by way of the heat sink end face thereby precluding deleterious acoustic waves from returning to the modulation region.

BRIEF DESCRIPTION OF THE DRAWINGS

These and other objects and advantages of the present invention will become apparent to one skilled in the art by reading the following specification and by reference to the drawings in which.

DESCRIPTION OF THE PREFERRED EMBODIMENT

Figure 1:
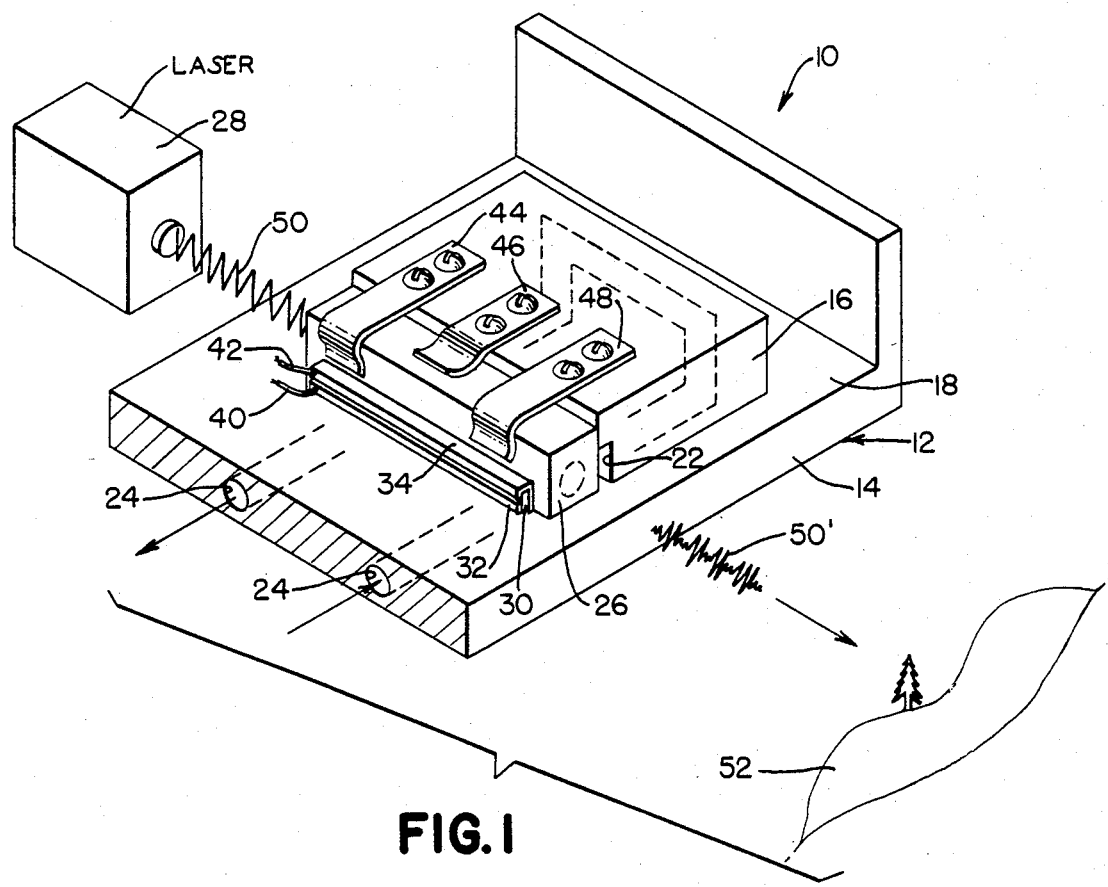
FIG. 1 is a partial isometric view of a device made in accordance with this invention for amplitude modulating a high powered light beam.
Figure 2:
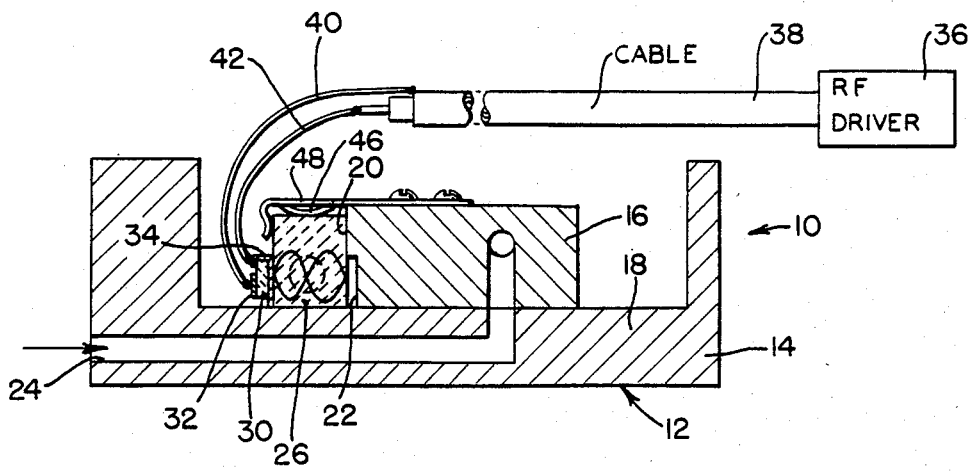
FIG. 2 is a cross-sectional view of the device of FIG. 1.

In the preferred embodiment of this invention the amplitude modulation is carried out by way of modulating device 10. Device 10 employs a heat sink made of aluminum or other conventional thermally conducting material. Heat sink 12 is formed of two members 14 and 16. Member 14 has an upper major surface 18 to which the lower surface of member 16 forms the upstanding portion of the heat sink and is secured, for example, by way of thermally conductive material. Member 16 has a vertically extending end face 20 defined by recess 22. Passageway 24 serves as a conduit for transporting recirculating coolants, such as water, from a reservoir (not shown).

A rectangular solid block 26 serves as the acousto-optical medium. In the preferred embodiment, block 26 is a germanium crystal with the dimensions of $12 \times 15 \times 40$ millimeters. As shown in FIG. 1, device 10 is adapted to receive a laser beam from laser 28 such that the beam 50 enters the block 26, propagates through the germanium crystal along the 112 crystal axis, and exists the block 26 as a zeroth order or undeflected beam 50'. The laser beam is also positioned so that it passes through the lower portion of block 26 between recess 22 and an acoustic transducer 30. Transducer 30 preferably takes the form of an $8 \times 35$ millimeter strip of lead zirconate titanate (PZT) having gold electrodes 32 and 34 on opposite surfaces thereof, electrode 34 curling over one edge of PZT transducer 30 to provide an easily accessible connection surface. A source 36 of radio frequency drive signals are connected to electrodes 32 and 34 by way of coaxial cable 38. Suitable impedance matching circuitry (not shown) may also be employed. In the preferred embodiment, thirty gauge copper wires 40, 42 are bonded to the electrodes using silver paint, with the opposite ends of wires 40, 42 being connected to the grounded shielding and insulated conductor in cable 38, respectively, which are, in turn, connected to source 36 through the impedance matching circuit. PZT transducer 30 is mounted to the lower portion of one side of germanium block 26 using suitable araldite material.

Germanium block 26 is held in good thermal contact with heat sink 12 by way of spring clips 44, 46 and 48. The bottom surface of block 26 thus is flush with major surface 18 of heat sink memeber 14. The upper side surface of block 26 is pressed against end face 20 of heat sink member 16. In such manner the side surface of block 26 directly opposite transducer 30 remains unobstructed for the purposes which will now be explained.

The operation of the present invention will be described in connection with a particular example in which the primary purpose is to amplitude modulate an infrared frequency laser beam (having a beam diameter of 5–7 millimeters and delivering 4–40 watts of power at carrier or modulating frequencies in excess of 1 megahertz). In particular, the present invention will be described in connection with amplitude modulating a $CO_2$ laser 28 which provides a beam of about 6 millimeters in diameter and delivers about 16 watts of power. Device 10 will operate to modulate the continuous wave beam 50 from laser 28 to provide an amplitude modulated zeroth order (or undeflected) beam 50' at its output which is modulated at a frequency of 7.8 megahertz.

A resonant or standing acoustic wave is generated along the 111 crystal axis direction in germanium block 26. The standing wave is established by launching an acoustic wave into block 26 from transducer 30 and allowing the wave to be reflected by the opposing parallel free surface bounded by recess 22. The width of germanium block 26 is chosen to be an integer multiple of the acoustic half wave lengths supplied by transducer 30 so that the counter propagating acoustic waves interfere to set up a resonant or standing acoustic wave. The acoustic wave collapses (i.e., due to destructive interference) twice per acoustic cycle such that the modulation frequency of the ultimately transmitted laser beam is exactly twice the drive frequency applied from source 36 to the acoustic transducer 30.

By way of experimentation it was determined that the strongest resonant acoustic frequency for germanium block 26 is at about 3.906 megahertz and thus the RF drive source 36 is conditioned to provide drive signals to transducer 30 at about the same frequency. Drive source 36 may comprise a conventional tunable RF oscillator (such as GRC model 1211B) and a broad band power amplifier (such as ENI Model 240L) with a through-line RF watt meter. The $CO_2$ laser 28 was a Laakmann Model 16000 which was up-collimated to a diffraction-limited 5.6 millimeter diameter beam (2.6 mrad divergence) and provided 16 watts of radiation to be modulated. Up-collimation serves to reduce the power density of the laser radiation within the modulating device 10 and, more particularly, to reduce the laser beam divergence such that the diffracted orders are spatially separated in the far field.

Almost 100% modulation of the laser beam 50 into the zeroth order beam 50' is accomplished by modulating device 10 with the drive source 36 providing only a limited amount of power. In this example, drive source 36 need only provide drive power on the order of less than about 2 watts and, more particularly, about 1 watt.

One skilled in the art should now realize that the standing wave modulator device 10 of the present invention using relatively low acoustic frequency drive signals has several advantages over conventional traveling wave modulator devices operating in the Bragg region with much higher acoustic drive frequencies. Whereas the present invention provides nearly 100% amplitude modulation efficiency with about 1 watt of RF drive at about 4 megahertz, a conventional traveling wave Bragg device provides only about 30% deflection efficiency and that required 10 watts of RF drive at 35 megahertz. Additionally, it has been discovered that the modulator device 10 is much less sensitive to changes in orientation. Modulator device 10 can be tilted by $\pm 3°$ with respect to the laser beam 50 with less than 10% loss in modulation efficiency. A much more considerable loss in efficiency is encountered when the traveling wave modulator device of the prior art is varied from the precisely defined Bragg angle. The modulator device 10, after being tuned for optimum modulation, can be left unattended for several hours without degradation of performance. The changing of RF drive power or incident laser power similarly has no deleterious effect upon the resonance of the device due to the excellent cooling arrangement provided by the heat sinking portion of the device 10.

The modulated laser beam as provided by the specific example set forth above finds particular applicability in an imaging sensor device. The beam is directed at the object 52 to be sensed. The distance between the sensor and various patterns in the scene can be readily detected by measuring the differences between the phases of successive beams rebounding off of the object. Since the acoustic transducer 30 is operated at a frequency of about 4 megahertz but the resulting beam is modulated at about 8 megahertz, very little radio frequency interference problems are encountered. For optimum usage as an image sensor device, laser 10 should provide electro-magnetic wave lengths between 8-12 microns and provide 4-40 watts of power with a beam diameter of 5-7 millimeters. The modulating or carrier frequency should be about 2-20 megahertz. The modulator device 10 and accompanying method for using it performs this function quite well.

However, it is expected that the present invention may find applicability in other applications. Greater or lesser modulating frequencies may be achieved by a selection of an acoustic transducer of appropriate half-wave thickness. The upper frequency limit is established by transducer technology, impedence matching and a loss of acoustic Q due to increased acoustic absorption at high frequencies. The lower frequency limit is established by the loss of acoustic Q which results from increased acoustic divergence or the overlapping of diffracted orders as the diffraction angle approaches the laser beam divergence.

Therefore, while this invention has been described in connection with specific examples thereof, no limitation is intended thereby except as defined in the appended claims. This is because other modifications will become evident to one skilled in the art after a study of the drawings, specification, and following claims.

I claim:

1. A method of amplitude modulating a high powered light beam in the megahertz range, said method comprising:
   using a laser to generate a beam with 4-40 watts of power;
   passing the beam through an acousto-optical crystal having an acoustic transducer on one surface; and
   generating a standing acoustical wave front in the crystal generally perpendicular to the beam by applying a drive signal to the transducer at a frequency sufficient to insure operation in the Raman-Nath domain whereby the zeroth diffraction order of said beam is efficiently modulated at twice the frequency of the drive signal.

2. A method of amplitude modulating the zeroth diffraction order of a high powered beam of infrared radiation at modulating frequencies in the megahertz range, said method comprising:
   using a laser to generate a 5-7 millimeter diameter beam with 4-40 watts of power having an electromagnetic wave length of 8-12 microns;
   passing the beam through an acousto-optical crystal having an acoustic transducer on one surface; and
   generating a standing acoustical wave front in the crystal generally perpendicular to the beam by applying a drive signal of less than two watts at a frequency of 1-10 megahertz to the transducer whereby the zeroth diffraction order of said beam is efficiently modulated at twice the frequency of the drive signal.

3. The method of claim 2 wherein said laser is a $CO_2$ laser.

4. The method of claim 2 wherein said crystal is germanium.

5. The method of claim 2 wherein said acoustic transducer is lead zirconate titanate.

6. A device for amplitude modulating a high powered beam of light, said device comprising:
   a heat sink having a major upper surface and an upstanding portion projecting from the major upper surface, the upstanding portion having an end face extending perpendicular to the major surface;
   an elongated block of acousto-optical crystal having its bottom mounted on the major surface of the heat sink and an upper portion of one side of the block abutting the end face of the upstanding portion of the heat sink;
   a strip of acoustic transducer material affixed to an opposite lower side of the crystal beneath a projection of the contact area between the crystal and the heat sink end face;
   means for coupling the acoustic transducer to a source of drive signals at frequencies sufficient to insure operation of the device in the Raman-Nath domain to thereby generate a standing acoustical wave front in the crystal propagating through the transverse axis of the crystal and rebounding off of the noncontacted opposite side of the crystal; and
   whereby a high powered laser beam is efficiently amplitude modulated by passing it through the length of the crystal generally perpendicular to the standing wave front therein.

7. The device of claim 6 which further comprises at least one passageway in the heat sink for carrying recirculating water.

8. The device of claim 6 wherein said crystal is held in contact with the heat sink by way of spring clips.

9. The device of claim 6 wherein said crystal is germanium.

10. The device of claim 6 wherein said acoustic transducer is lead zirconate titanate.

* * * * *

UNITED STATES PATENT AND TRADEMARK OFFICE
CERTIFICATE OF CORRECTION

PATENT NO. : 4,509,829
DATED : April 9, 1985
INVENTOR(S) : Lauren M. Peterson

It is certified that error appears in the above-identified patent and that said Letters Patent are hereby corrected as shown below:

Column 1, line 20, insert --commonly assigned-- after "in".

Column 1, line 23, delete "whch" and insert --which--.

Column 3, line 31, delete "exists" and insert --exits--

Column 3, line 55, delete "memeber" and insert --member--.

Signed and Sealed this

Fifteenth Day of October 1985

[SEAL]

Attest:

Attesting Officer

DONALD J. QUIGG

Commissioner of Patents and Trademarks—Designate